United States Patent [19]
Fridman et al.

[11] Patent Number: 5,271,535
[45] Date of Patent: Dec. 21, 1993

[54] INSTANT COFFEE DISPENSER

[76] Inventors: Vladimir Fridman; Alexander Fridman; Gregory Fridman, all of 404 S. Little Tor Rd., New City, N.Y. 10956

[21] Appl. No.: 888,011
[22] Filed: May 26, 1992
[51] Int. Cl.$^5$ .................................. G01F 11/46
[52] U.S. Cl. .................... 222/427; 222/430
[58] Field of Search .......... 222/426, 427, 428, 430, 222/429

[56] References Cited
U.S. PATENT DOCUMENTS

| | | | |
|---|---|---|---|
| 1,291,804 | 1/1919 | Eckstein | 222/428 |
| 2,024,023 | 12/1935 | Beach | 222/428 |
| 2,072,938 | 3/1937 | Berg | 222/427 |
| 2,107,324 | 2/1938 | Boyle | 222/429 |
| 3,211,334 | 10/1965 | McShea | 222/427 X |
| 3,543,814 | 12/1970 | Aluotto | 141/335 |
| 4,066,186 | 1/1978 | Agey | 222/48 |

Primary Examiner—Sherman Basinger

[57] ABSTRACT

A dispenser for instant coffee or the like which may be used as independent unit or attached to the storage container. A dispenser includes a housing and a plate with measuring cavities of different volume. The cavity plate is journaling the assembly of the disc and shutter which are resiliently preloaded against cavity plate. A handle is attached to the disc and protrudes outwardly through the opening in the housing. The handle is adapted to be rotated by the user of dispenser for rotation of the disc and shutter for dispensing desired amount of instant coffee or the like from each cavity.

9 Claims, 4 Drawing Sheets

INSTANT COFFEE DISPENSER

BACKGROUND OF THE INVENTION

1. Field of Application

The subject invention generally pertains to a dispenser for dispensing various substances, and particularly instant coffee, powdered milk or ice tea.

2. Description of the Prior Art

Many various dispensers have long been used to dispense instant coffee, powdered milk, ice tea or other dry substances. Exemplary of such dispensers is the device disclosed in U.S. Pat. No. 4,066,186 issued to Michael J. Agey. The disclosed dispenser is constructed as independent unit and relatively big in size, have many parts and required the loading of substances being dispensed. Another type of dispenser is disclosed in U.S. Pat. No. 3,543,814 issued to Peter A. Aluotto. This device allows only single dispensing and requires continuous refilling.

SUMMARY OF THE INVENTION

It is therefore an object of this invention to provide a simple, compact and inexpensive dispensing device.

It is another object of this invention to provide a dispensing device which can be used with standard coffee or the like container or with distinctive container.

It is still another object of this invention to provide a dispensing device that is accurate and precise.

It is yet still another object of this invention to provide a dispensing device which allows to keep coffee or the like container always separated from surrounding environment to preserve the freshness.

It is still further object of this invention to provide a dispensing device which allows the user to easily obtain a predetermined quantity of a coffee or the like and prevent accidental dispensing.

Other objects, features and advantages of the invention in its details of construction and arrangement of the parts will be seen from the above and from the following description of the preferred embodiments when considered with the drawings and from the appended claims.

DESCRIPTION OF A PREFERRED EMBODIMENT

Figure 1:
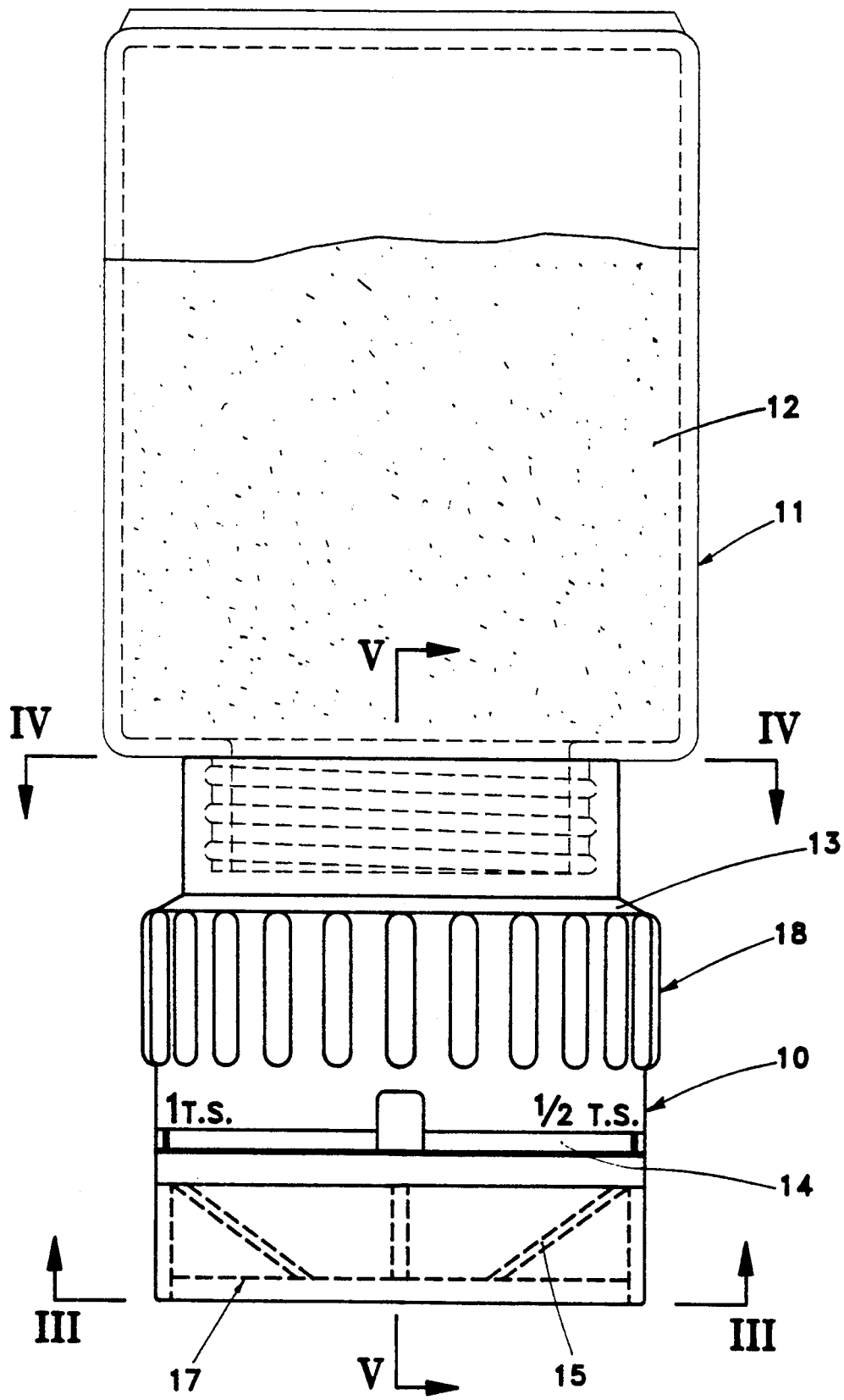
FIG. 1 is a view of a dispenser constructed in accordance with the invention, shown attached to the container filled with dry substance.

In FIG. 1 reference numeral 10 generally designates a dispenser that may be manufactured from plastic including transparent or from metal, shown attached to a container 11 filled with dry substance 12. The dispenser 10 shown screwed to the container but it will be understood that the principle of the invention may be applied to any conventional means of detachable joining. Also described dispenser may be used without being attached to the storage container as an independent unit.

The dispenser includes a housing means 13 adapted to be attachable to the storage container and provided with conical shaped formation 15 which is open at the bottom and includes ribs 17 which are connected with outer portion of housing 13 and support dispenser over suitable receptacle.

In the embodiment shown the housing means also includes an opening 14 in the side wall and a series of uniformly spaced vertically elongated rounded protrusions 18 to facilitate screwing.

Figure 5:
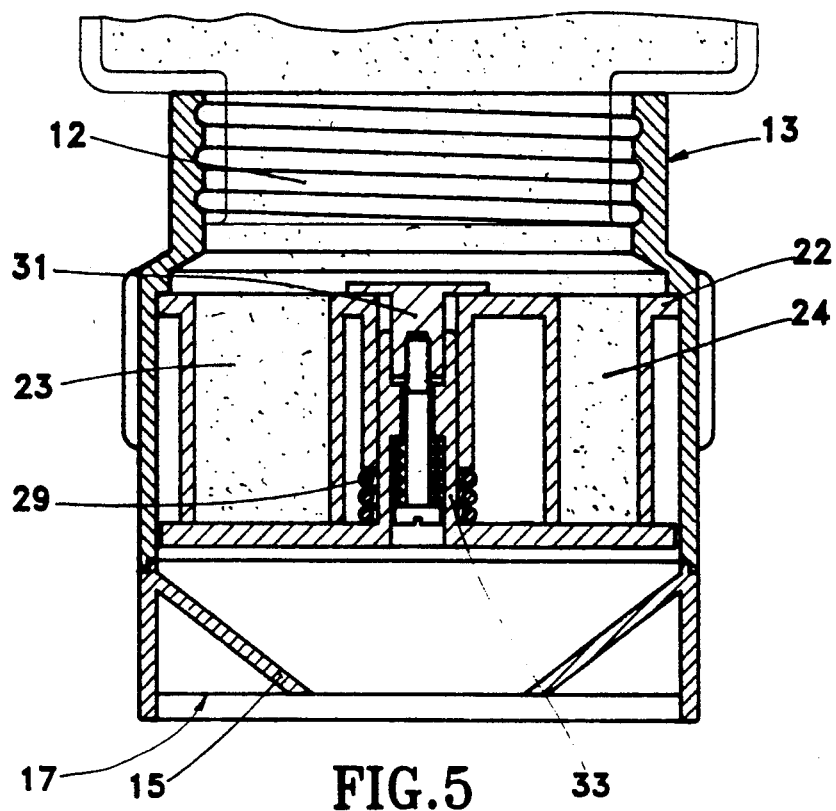
FIG. 5 is a sectional view taken along VI—VI of FIG. 2.
Figure 4:
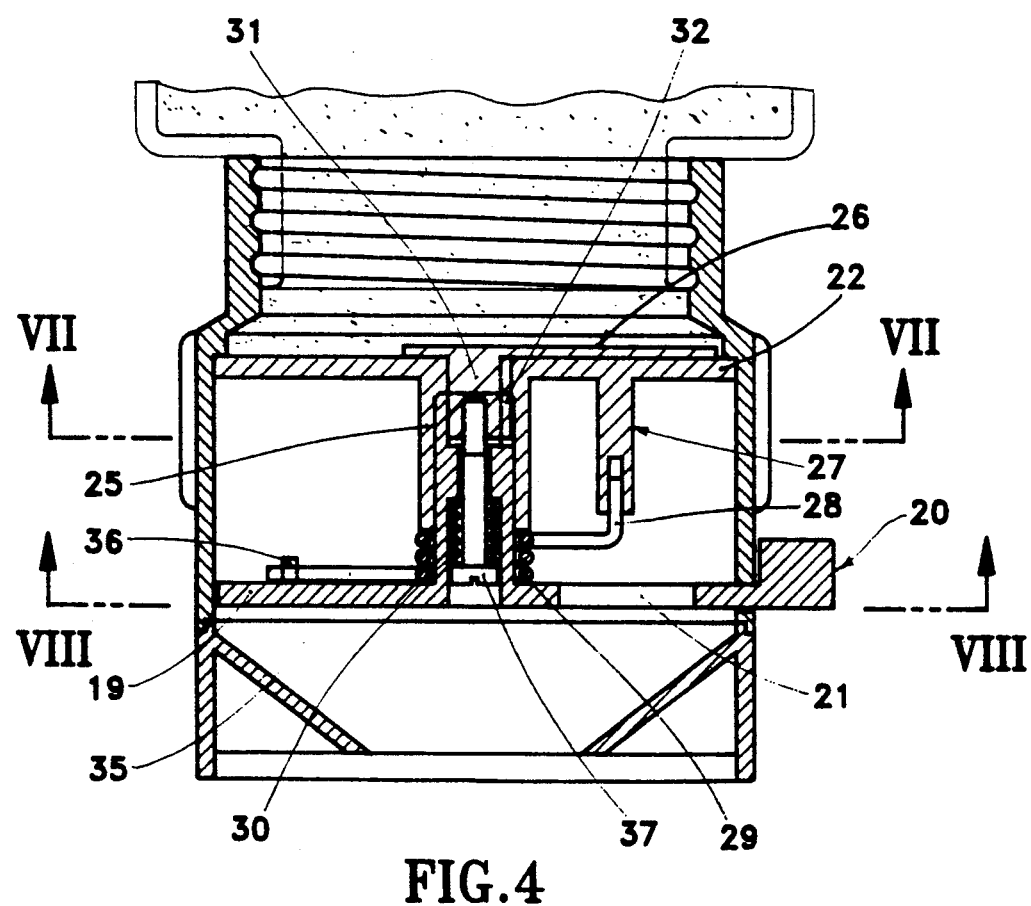
FIG. 4 is a sectional view taken along V—V of FIG. 1.

A cavity plate 22 with plurality of measuring cavities for receiving therein an instant coffee or the like to be dispensed is fixedly secured to the inner surface of the housing means 13 (seen best in FIG. 4 and FIG. 5). Cavity plate 22 may be secured to the housing means 13 by gluing, ultrasonic welding or other conventional means. Also it may be formed as an integrated portion of the housing means 13.

In preferred embodiment the cavity plate contains two cavities 23 and 24 of different volume (seen in FIG. 5) but it will be understood that the principle of the invention may be applied to other numbers of cavities with different volumes. In preferred embodiment the volume of cavity 23 is a one teaspoon and the volume of cavity 24 is a half of the teaspoon. The cavities in FIG. 5 are shown filled with dry substance.

As shown in FIG. 4 the cavity plate includes a central round-shaped formation 25, the inner portion of the formation 25 journals the assembly of the disc 19 and the shutter 26. The cavity plate 22 also includes another formation 27 which anchors portion 28 of torsion spring 29. A disc 19 is rotatably mounted with respect to cavities 23 and 24 and includes opening 21 to permit dispensing a selected quantity of substances from each cavity. The disc 19 also has a handle 20 extending outwardly through opening 14. Opening 14 is suitable for circular movement of handle 20. The opening 21 in the disc 19 is shaped the same way as the opening in the biggest cavity. This permits the entire contents of each cavity to be discharged without any residue remaining therein. A handle 20 may be integrally formed or attached to the disc 19 and adapted for rotation of the disc 19 by user for dispensing substance from cavities 23 and 24.

Figure 6:
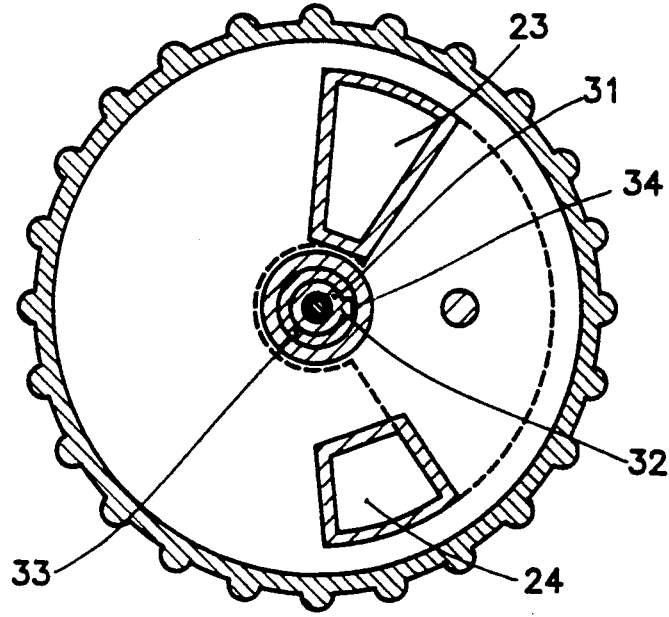
FIG. 6 is a sectional view taken along VII—VII of FIG. 4.

The shutter 26 (seen also in FIG. 3) for closing cavities from inside slidably fastened in a vertical direction to the disc 19 by means of compression spring 30 and screw 37 fixedly connected to the shutter 26. The latter is shaped as a combination of partial circle and circular sector and encloses a hub 31 with projection 32 to be received by slot 34 of bushing 33 which is integral with disc 19 (seen best in FIG. 6). The projection 32 compels the shutter 26 to rotate together with the disc 19. As also shown in FIG. 4 the straight end 35 of torsion spring 29 is placed between two round formations 36 of disc 19.

When disc 19 is moved in either direction the spring 29 urges disc 19 and shutter 26 to the middle position. It is noteworthy that the disc and shutter are forming a rotatable assembly and are moderately preloaded by spring 30 against cavities causing tight closing of the same.

Figure 3:
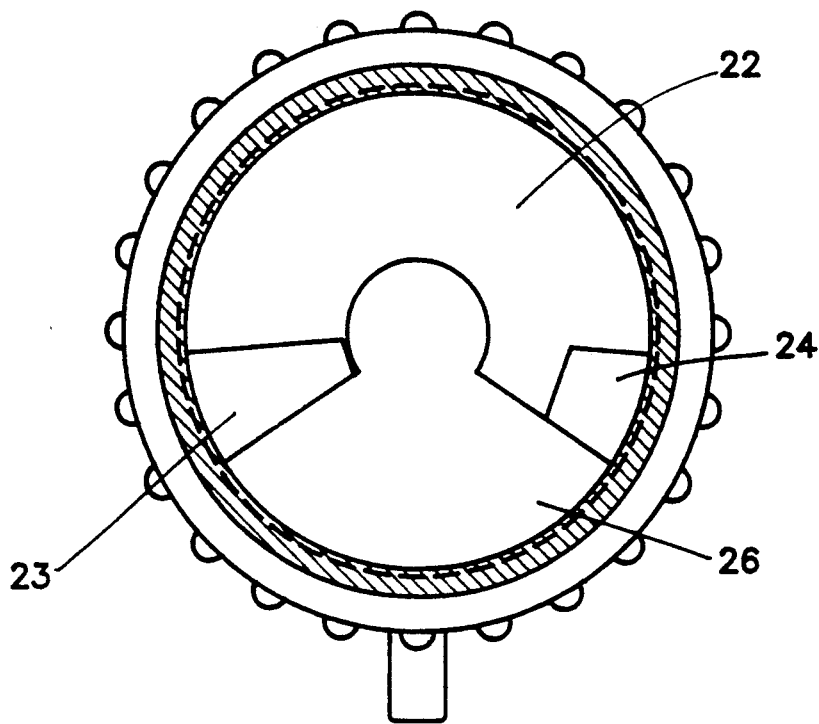
FIG. 3 is a sectional view taken along IV—IV of FIG. 1.
Figure 2:
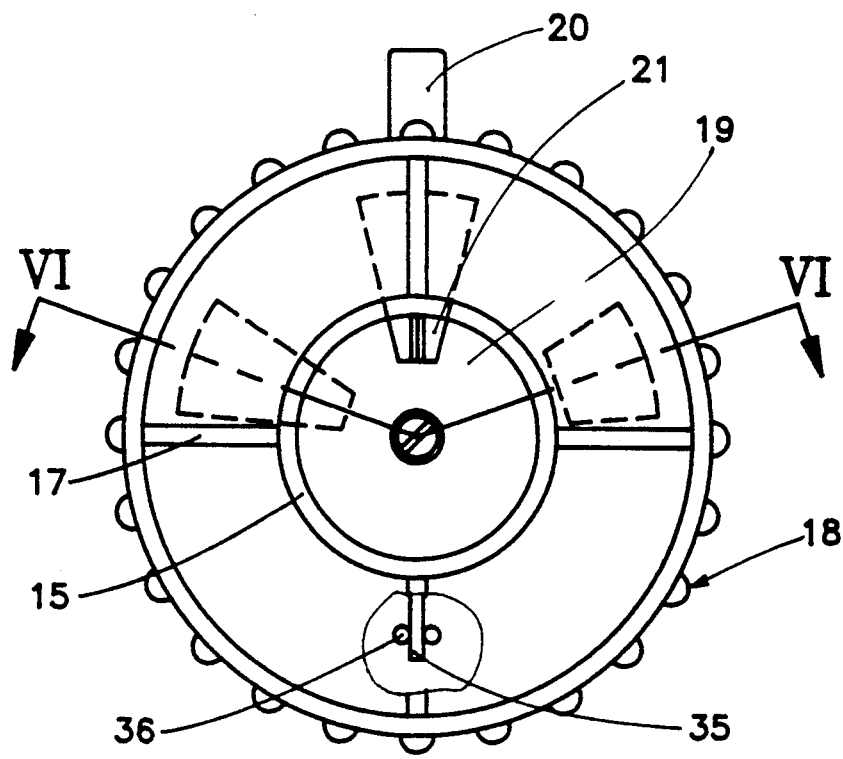
FIG. 2 is a bottom of view of the dispenser indicated by a line III—III in FIG. 1, showing the handle in the middle position.

When the handle 20 is in middle position the cavities 23 and 24 are opened from inside (looking in the direction of the arrows IV—IV in FIG. 1) and closed from outside (looking in the direction of arrows III—III in FIG. 1). The position of the disc 19 and shutter 26 when handle 20 is in the middle position is shown in FIGS. 2 and 3 respectively.

When dispensing is desired the device is positioned over the cup or other receptacle and the ribs 17 could be in contact with this receptacle. Then user has to rotate the handle 20 toward cavity 23 (to receive one teaspoon of dry substance) or toward cavity 24 (to receive half of teaspoon of the same).

Figures 7, 8:
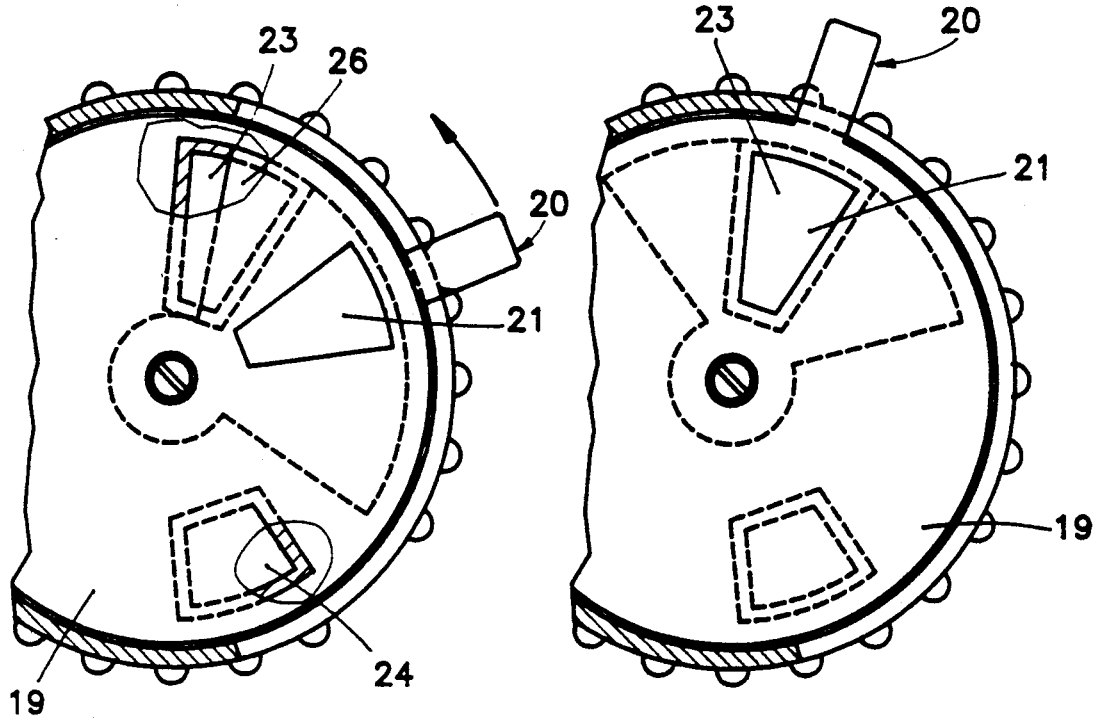
FIG. 7 is a sectional view taken along line VIII—VIII of FIG. 4, showing the parts in condition in which handle was moved partially toward to the "one spoon" cavity.
FIG. 8 is a sectional view along the same line VIII—VIII of FIG. 4, showing the parts in condition in which handle was moved to its limit to "one spool" cavity.

If for example, the handle is rotated counterclockwise toward cavity 23, as shown in FIG. 7, the shutter 26 will close the cavity 23 form inside cutting off the amount of dry substance which is in the cavity from the rest of the substance which is in the container. The cavity 23 would be closed from the top by shutter 26 before the opening 21 in the disc 19 reaches bottom opening in the same cavity. When opening 21 in the disc and the opening in the cavity 23 are aligned (seen in FIG. 8) the substance which was in the cavity 23 pours out into receptacle without any residue remaining.

During rotation of disc 19 from middle position to its limit position counterclockwise the cavity 24 is closed from outside by disc 19.

When handle 20 is released the disc and shutter are moved to the middle position by spring 29. During this rotation the cavity 23 is closed by disc 19 from outside and the shutter 26 opens the same cavity from inside. As cavity is open from inside the substance fills its volume. To receive substance form cavity 24 the handle must be rotated toward this cavity to its utmost position and the actions take place in the same manner as described above. The described dispenser substitutes the container cap providing tight closure and preserving freshness of instant coffee or the like. Although the invention is described with respect to a preferred embodiment, modifications thereto will be apparent to those skilled in the art. Therefore the scope of the invention is to be determined by reference to the claims which follow.

I claim:

1. A coffee dispenser comprising:
    a generally rounded housing means adapted to be attachable to a container of coffee, said housing means is provided with a conical shaped formation which is connected with an outer portion of said housing by ribs,
    a cavity plate with a plurality of measuring cavities for receiving therein the coffee to be dispensed, said cavities being formed by vertical walls and each having its ends open, said cavity plate is fixedly secured to said housing means,
    a circular disc rotatable mounted with respect to each said cavity, said disc having an opening for registration with the cavities to permit dispensing a selected quantity of coffee from each cavity,
    a shutter mounted above the cavities and adapted to close said cavities and slidable, but non-rotatable fastened in a vertical direction to the said disc, rotating in unison with said disc and is being urged toward said cavity plate by a compression spring,
    a torsion spring to urge said disc and said shutter toward a middle position in which upper ends of said measuring cavities are open and lower ends of said cavities are closed.

2. A dispenser as in claim 1, wherein said housing means includes a series of uniformly spaced vertically elongated round protrusions, disposed on the outer surface of the said housing.

3. A dispenser as in claim 1, wherein said cavity plate is formed as an integrated portion of said housing means and comprises a plurality of measuring cavities of different volume.

4. A dispenser as in claim 1, wherein said cavity plate includes a first central, round shaped, hollow, downwardly extended formation to journal the said disc and said shutter and a second downwardly extended formation to anchor a portion of said torsion spring.

5. A coffee dispenser comprising:
    a housing means adapted to be attachable to a coffee container, said housing means is provided with a conical shaped formation which is open at the bottom and is connected with an outer portion of said housing by ribs,
    a cavity plate with a plurality of measuring cavities with different volumes adapted to receive coffee from said container, said cavities being formed by vertical walls,
    a spring biased disc rotatable mounted with respect to each cavity and operable in clockwise and counterclockwise direction to permit dispensing a selected quantity of coffee from each cavity,
    a shutter mounted above the cavities and adapted to close said cavities upon rotation in unison with said disc,
    a torsion spring to urge said disc and said shutter toward a middle position in which upper ends of said measuring cavities are open and lower ends of said cavities are closed.

6. A dispenser as in claim 5 wherein said disc comprising a handle extending outwardly from an outermost circular surface of the said disc and adapted to be rotated by an operator.

7. A dispenser as in claim 5 wherein said disc comprising an upwardly extending round formation connecting said shutter mounted above the cavities for circular movement in unison with said disc.

8. A dispenser as in claim 7 wherein said torsion spring is surrounding the round formation of the said disc and a straight horizontally disposed portion of the said spring is placed between two anchor formations on an inner surface of the said disc and an upwardly extending portion of the said spring is placed in a downwardly extended second formation of the cavity plate.

9. A dispenser including a container for instant coffee comprising:
    a housing means adapted to be attachable to said container, said housing means is provided with a conical shaped formation which is open at the bottom and is connected with an outer portion of said housing by ribs,
    a cavity plate having varying sized cavities for measuring a desired amount of coffee,
    a spring biased circular disc, said disc is manually operable in both directions, clockwise and counterclockwise and automatically returns to the middle position after being released by an operator,
    a shutter adapted to close the cavities upon rotation in unison with said disc.
    a screw mounted in said shutter,
    a compression spring surrounding said screw and being in contact with an inner surface of the head of said screw and a flat surface of a round formation located on the circular disc.

* * * * *